United States Patent [19]

Nishimura et al.

[11] Patent Number: 4,989,899
[45] Date of Patent: Feb. 5, 1991

[54] WEBBING DRIVE APPARATUS FOR AUTOMATIC SEAT BELT APPARATUS

[75] Inventors: Yuji Nishimura; Takashi Ogasawara, both of Niwa, Japan

[73] Assignee: Kabushiki Kaisha Tokai-Rika-Denki-Seisakusho, Aichi, Japan

[21] Appl. No.: 338,742

[22] Filed: Apr. 17, 1989

[30] Foreign Application Priority Data

Apr. 21, 1988 [JP] Japan .............. 63-53764[U]

[51] Int. Cl.$^5$ ............................................. B60R 21/10
[52] U.S. Cl. ................................. 280/804; 280/802; 242/54 A; 74/506; 74/89.15
[58] Field of Search .................. 280/801, 802, 804; 242/54 A, 158.2; 74/89.2, 89.22, 506, 89.15

[56] References Cited

U.S. PATENT DOCUMENTS

| | | | |
|---|---|---|---|
| 2,343,684 | 3/1944 | Mace | 242/54 A |
| 4,268,068 | 5/1981 | Suzuki et al. | 280/804 |
| 4,410,202 | 10/1983 | Takada | 280/804 |
| 4,498,690 | 2/1985 | Takada | 280/804 |
| 4,564,218 | 1/1986 | Yokote et al. | 280/804 |
| 4,580,813 | 4/1986 | Hashimoto | 280/804 |
| 4,655,477 | 4/1987 | Takada | 280/804 |
| 4,852,908 | 8/1989 | Nishimura | 280/804 |

Primary Examiner—Charles A. Marmor
Assistant Examiner—Tamara L. Finlay
Attorney, Agent, or Firm—Oliff & Berridge

[57] ABSTRACT

A webbing drive apparatus for an automatic seat belt apparatus in which a webbing is automatically fitted around an occupant by driving one end of the webbing which comprises a screw plate with which one end of a wire for driving the webbing is engaged and which has portions for contact with a drum so as to be rotated through the contact portions by the rotational force of the drum. It is as well as moved in the direction of the rotational axis of the drum, whereby the wire is spirally wound around the drum. Each of the contact portions have a bent portion which is bent substantially at right angles with respect to the rotational direction of the drum. The rotational force of the drum is therefore transmitted to the screw plate through these bent portions.

18 Claims, 3 Drawing Sheets

WEBBING DRIVE APPARATUS FOR AUTOMATIC SEAT BELT APPARATUS

BACKGROUND OF THE INVENTION

1. Field of the Invention

The present invention relates to a webbing drive apparatus for an automatic seat belt apparatus which is capable of moving one end of a webbing used for automatically fitting around and restraining a seat occupant.

2. Description of Prior Art

An automatic seat belt apparatus which allows a webbing to be automatically fitted around a seat occupant comprises a webbing drive apparatus for moving one end of a webbing and fitting it around a seat occupant.

Some of such types of webbing driving apparatus comprise a wire, with which one end of a webbing is engaged, a drum which is rotated by a driving force and a screw plate with which the one end of the wire is engaged and in which is formed a portion for contact with the drum, when the drum is rotated. The screw plate is rotated through the contact portion, as well as being moved in the direction of the rotational axis of the drum, so that the wire is spirally wound around the drum and one end of the webbing is consequently moved.

However, since the contact portion in the screw plate of this webbing drive apparatus is formed using a cut end surface, the portion for contact with the drum has a small area and a rough surface. There are, therefore, certain disadvantages in that the rotation of the drum is transmitted to the screw plate with a low degree of efficiency. Also, the resistance of the drum to the movement of the screw plate in the direction of the rotational axis of the drum is increased. This causes a deterioration in the performance of the drum as well as an increase in the wear of the drum.

In view of the above-described circumstances, it is an object of the present invention to provide a webbing drive apparatus for an automatic seat belt apparatus which comprises a screw plate exhibiting a high degree of efficiency and a drum which is subjected to a reduced degree of wear.

SUMMARY OF THE INVENTION

A webbing drive apparatus for an automatic seat belt apparatus of the present invention which serves to drive one end of a webbing to be fitted around a seat occupant and automatically fit the same comprises a wire which is connected to one end of the webbing, a drum which is rotated by a driving force, and a screw plate with which the wire is engaged and which has portions for contact with the drum and is rotated as well as being moved in the direction of the rotational axis of the drum by virtue of the contact portions when the drum is rotated. This causes the wire to be spirally wound around the drum, thus driving one end of the webbing. Each of the contact portions have a bent portion which is bent substantially at right angles with respect to the rotational direction of the drum and which is brought into contact with the drum when the drum is rotated.

In the above-described arrangement of the present invention, the rotation of the drum is transmitted to the screw plate through the contact portions. Thus the screw plate is rotated and moved along the rotational axis of the drum. The rotation of the screw plate and its movement along the rotational axis of the drum cause the wire to be wound around the drum so that one end of the webbing is driven so as to be fitted around a seat occupant. Since the contact portions have portions which are bent substantially at right angles with respect to the rotational direction of the drum, the rotational force of the drum is received by a large and smooth surface. Thus, the rotation of the drum can be transmitted to the screw plate with a high degree of efficiency, and the resistance to the movement of the screw plate in the direction of the rotational axis of the drum is reduced.

As described above, the present invention has excellent advantage in that the efficiency of the screw plate is increased, and wear of the drum is reduced.

DETAILED DESCRIPTION OF THE PREFERRED EMBODIMENT

Figure 3:
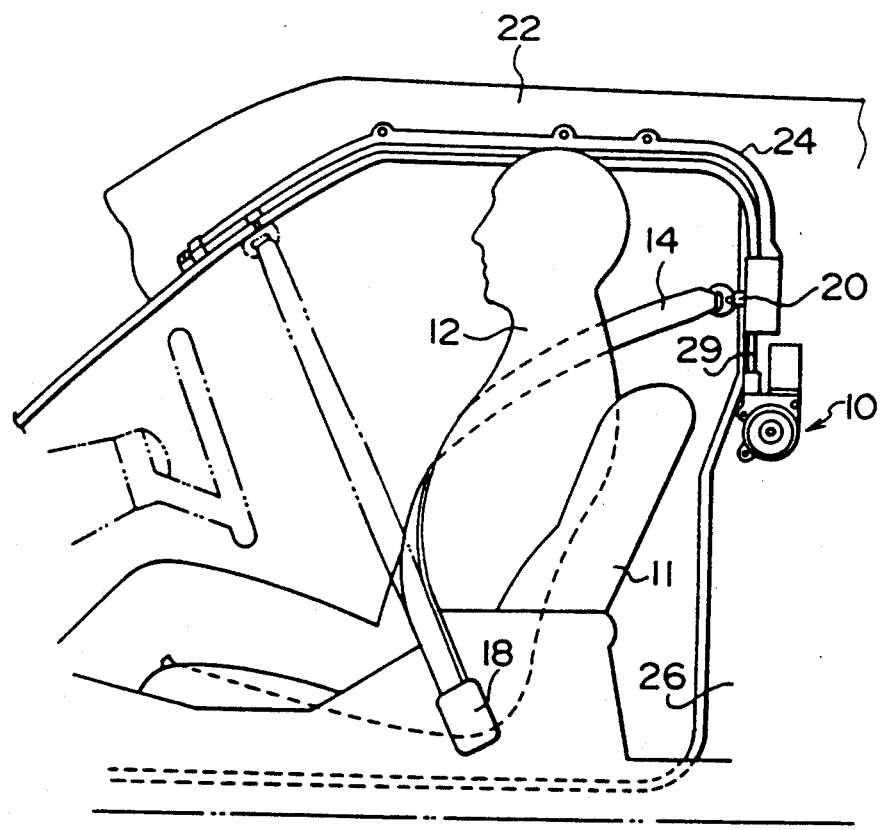
FIG. 3 is a side view of a seat belt apparatus employing the webbing driving apparatus shown in FIG. 1 as viewed from the side of a vehicle.

FIG. 3 shows an automatic seat belt apparatus which employs a webbing drive apparatus in an embodiment of the present invention.

In this automatic seat belt apparatus, a webbing 14 is automatically fitted around an occupant 12 after he sits on a seat 11. One end of the webbing 14 is wound up by a take-up apparatus 18 which is provided substantially at the center of the vehicle. The take-up apparatus 18 contains an inertia lock mechanism for preventing the webbing 14 from being pulled out when the speed of the vehicle is rapidly reduced.

A slider 20 is provided at the end of the webbing 14 which is pulled out from the take-up apparatus 18. The slider 20 is moved while being guided along a guide rail 24 which is placed along a roof side rail 22 of the vehicle in the longitudinal direction along the vehicle. One end of a wire 28 (shown in FIG. 1) is connected to the slider 20 and is moved along the guide rail 24 through the wire 28 in the longitudinal direction along the vehicle by the webbing drive apparatus 10 which is disposed on a central portion of a center pillar. In the state wherein the slider 20 is at a position in the guide rail 24 at the rear end of the vehicle, the webbing 14 is fitted around the occupant 12, as shown by the solid lines in FIG. 3. In the state wherein the slider 20 is at a position at the front end of the guide rail 24, the webbing 14 is removed from the occupant 12. The portion of the wire 28 between the slider 20 and the webbing drive apparatus 10 is tightly received in a tube 29 which is interposed between the end of the guide rail 24 and the webbing drive apparatus 10 so as to be movable in the longitudinal direction.

Figure 2:
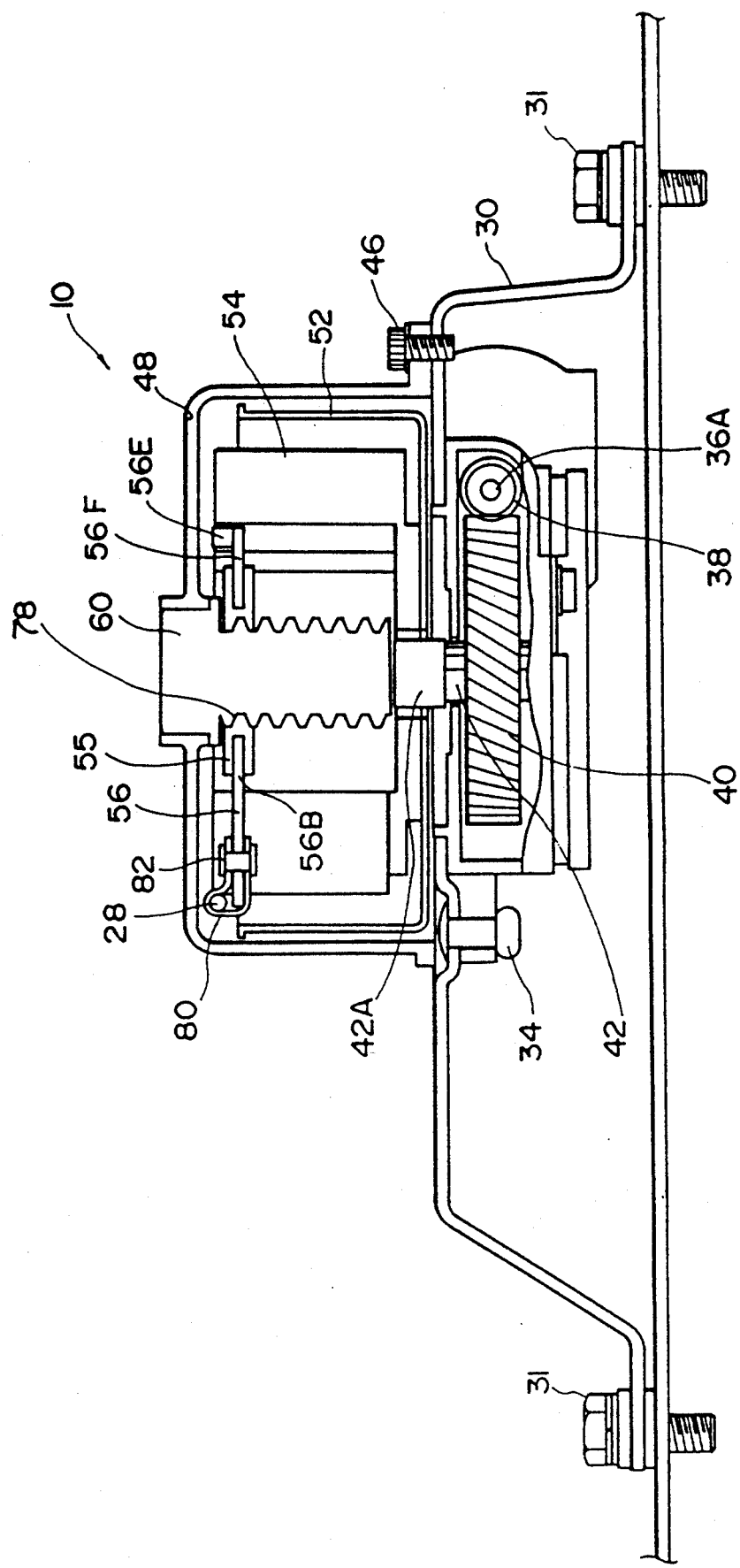
FIG. 2 is a sectional view of the state of the apparatus shown in FIG. 1 at the time of assembly.

As shown in FIG. 2, the webbing drive apparatus 10 is provided with a base plate 30 which has a circular hole 30A formed substantially at the center thereof and three leg plates 30B formed in a curved fashion around the periphery thereof. The ends of these three leg plates 30B are fixed to the center pillar 26 by means of bolts 31 (see FIG. 3).

Figure 1:
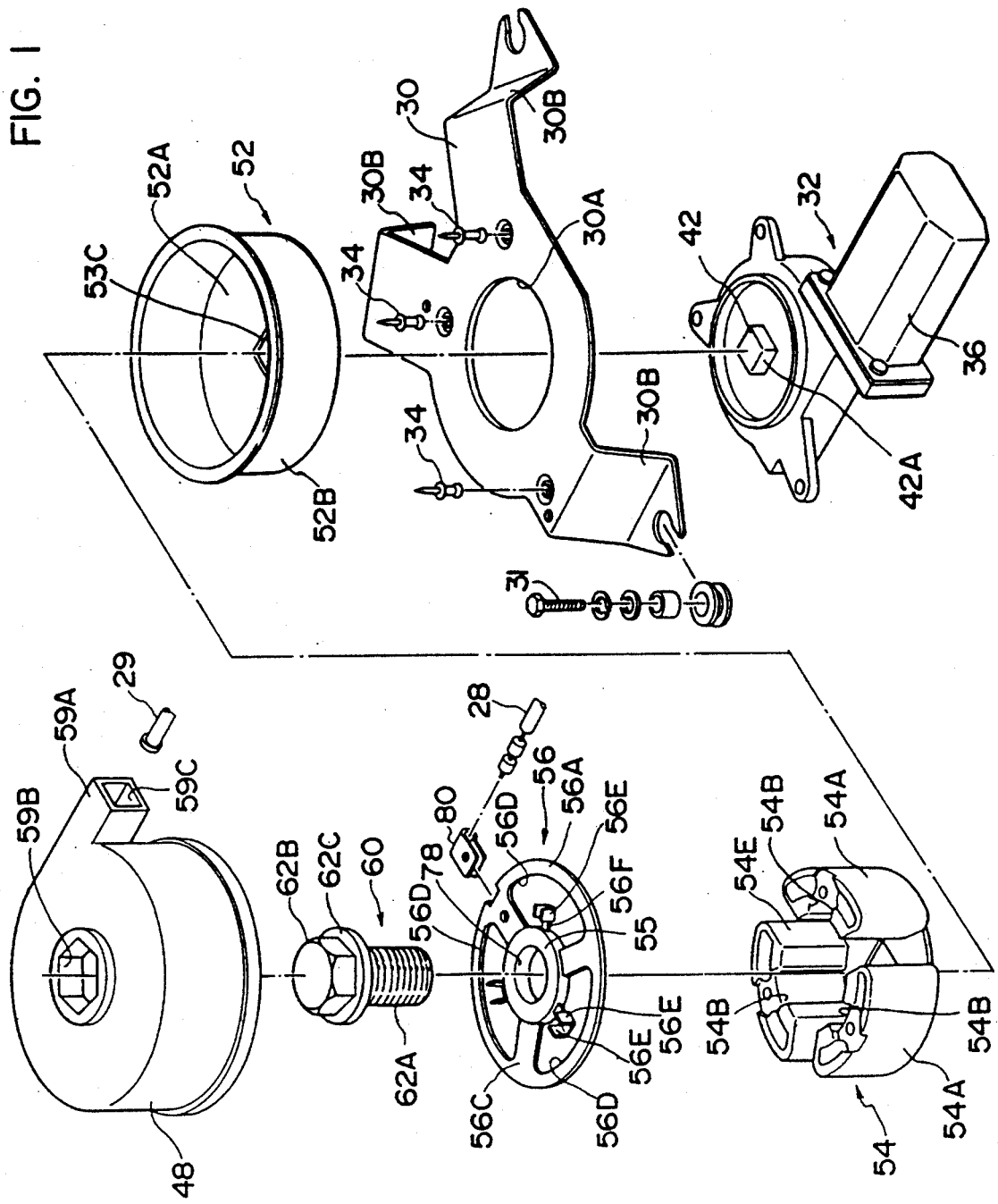
FIG. 1 is an exploded perspective view of a webbing drive apparatus to which the present invention is applied.

A gear box 32 is provided in a substantially central portion of the base plate 30 by means of rivets 34 between the base plate 30 and the center pillar 26. As shown in FIG. 1, the gear box 32 is provided with a motor 36 and a rotational shaft 42 which is rotatably provided such as to be in an upright position.

The motor 36 is connected to a switch (not shown) which functions to detect when the occupant 12 enters or gets out of the vehicle so that the motor is operated when the occupant 12 enters or gets out. As shown in FIG. 2, a worm gear 38 is coaxially provided on the output shaft 36A of the motor 36 so that the rotational shaft 42 can be rotated through the worm gear 38 and a worm wheel 40 which engages the worm gear 38.

As shown in FIG. 1, the rotational shaft 42 passes through the circular hole 30A of the base plate 30 and projects from the base plate 30 toward the center of the passenger compartment of the vehicle.

On the other hand, a cover 48 is provided on the side of the base plate 30 which is opposite the gear box 32 by a machine screw 46. An outer drum 52, an inner drum 54 and the screw plate 56 are disposed so as to be received in the cover 48 in this order.

The cover 48 is made of synthetic resin and has a projecting portion 59A which is so formed as to project from an upper portion of the side wall in the direction of a tangential line. The projecting portion 59A has a through hole 59C formed therein which allows the tube 29 to be passed therethrough and held. The wire 28 therefore passes through the through hole 59C and is introduced into the cover 48. In a central portion of the top wall of the cover 48 is formed an angular hole portion 59B which supports screw 60 having a hexagonal form. The screw 60 functions to axially guide and move the screw plate 56. The screw 60 is made of the same synthetic resin as the cover 48 and has an external threads, with a large pitch, formed on a portion of the periphery thereof from one end of the screw 60 to the center thereof, and which engages with the screw plate 56. The screw 60 has a hexagonal portion 62B formed on its periphery at the other end and designed to engage with the angular hole portion 59B, as well as having a flange portion 62C which is formed between the external thread 62A and the hexagonal portion 62B. The hexagonal portion 62B of the screw 60 is passed through the angular hole portion 59B and fixed with the aid of an adhesive. Since the flange portion 62C is brought into contact with the inner surface of the cover 48 when the hexagonal portion 62B is inserted into the angular hole portion 59B, it is used for determining the length of the portion of the screw 60 to be axially inserted into the cover 48.

The outer drum 52 has a cup-like form comprising a circular bottom plate 52A and a side ring plate 52B. A rectangular hole 53C is formed at the center of the bottom plate 52A and a driving portion 42A with a rectangular cross-section formed at the end of the rotational shaft 42 engages the rectangular hole 53C. The outer drum 52 is therefore rotated integrally with the rotational shaft 42 by the rotation of the rotational shaft 42.

The inner drum 54 is fixed to the bottom plate 52A in the outer drum 52 so as to be rotatable together with the outer drum 52. The inner drum 54 has the form of a disc and has three projecting portions 54A which each having a substantially sector-formed cross-section and which are provided at three positions around the axis so as to project in the axial direction at substantially equal distances. A wire receiving space for receiving the wire 28 is provided between the projecting portions 54A and the side plate 52B of the outer drum 52. The inner drum 54 has U-shaped grooves 54B provided respectively at inner side of the each projecting portion 54A.

The screw plate 56 is formed by being punched out from a metal plate and has an outer ring portion 56A with a large diameter, an inner ring portion 56B with a small diameter and three connection portions 56C which connect the two ring portions together at equal distances. Three sector-formed holes 56D are respectively formed between the adjacent joint portions 56C. The projecting portions 54A of the inner drum 54 are axially movably engaged with the sector-formed holes 56D. Space 54E is provided between the projecting portions 54A, respectively, and the joint portion 56C of the screw plate 56 is inserted into the space 54E of the iner drum 54 so as to move along the axial direction of the drum. The end of the wire 28 is engaged with the external ring portion 54A of the screw plate 56 by means of a rivet 82 through a clamp 80. A ring member 55 made of synthetic resin is also fixed to the internal ring portion 56B of the screw plate which thus has a thickness greater than those of the other portions. An internal thread 78 is provided on the axial portion of the screw plate 56. The screw 60, which is fixed to the cover 48, is screwed into the internal thread 78. The screw plate 56 also has projections 56F which are so formed as to outwardly project from the internal ring portion. 56B between the respective adjacent connection portions 56C. Both sides of each of the projections 56F are widened at their ends as well as being bent substantially at right angles in the same direction, to form a bent portion 56E. These bent portions 56E are respectively brought into contact with the sides of the U-shaped concave grooves 54B which are respectively formed in the projecting portions 54A of the inner drum 54 in correspondence with the projections 56F, whereby the screw plate 56 can be rotated together with the inner drum 54. The screw plate 56 is therefore rotated when the rotational force of the rotational shaft 42 is transmitted through the outer drum 52 and the inner drum 54, as well as being moved in the direction of the rotational axis of the inner drum 54 while being guided by the screw 60. As a result, when the screw plate 56 is rotated in the positive direction, the wire 28 is wound around the periphery of the inner drum 54. When it is rotated in the reverse direction, the wire 28 is wound out from the inner drum 54. The wire 28 is wound once around the periphery of the inner drum 54 each time the rotational shaft 42 is rotated once in the positive direction. The screw plate 56 is also moved in the axial direction through a distance equivalent to the diameter of the wire 28 so as to cause the wire 28 to be tightly wound around the periphery of the inner drum 54. The width of the space for receiving the wire 28 which is formed between the outer drum 52 and the projecting portions 54A of the inner drum 54 is determined to be between a value equivalent to the diameter of the wire 28 and a value representing twice that diameter so that the wire can be securely wound out.

A description will now be given of the function of the embodiment.

In a state wherein there is no occupant 12 on the seat 11, the slider 20 is placed at a position in the guide rail 24 toward the front of the vehicle, and the webbing 14 assumes the state shown by the phantom lines in FIG. 3.

The occupant 12 can therefore easily enter the vehicle and sit on the seat 11.

When the occupant sits on the seat 11, the switch (not shown) detects this and causes the rotational shaft 42 to be rotated in the positive direction by a motor 36. Consequently, the outer drum 52, the inner drum 54 and the screw plate 56 are rotated in the positive direction, and thereby spirally winding the wire 28 around the inner drum 54. Thus the slider 20 is moved toward the rear side of the vehicle by the driving force of motor 36 along the guide rail 24 and through the wire 28 so that the webbing 14 is automatically fitted around the occupant 12, as shown by the solid lines in FIG. 3.

Since the take-up apparatus 18 prevents the webbing from being pulled out when the speed of the vehicle is rapidly reduced, the occupant 12 is securely restrained by the webbing 14.

When the occupant 12 gets out of the vehicle, the switch (not shown) detects this and causes the rotational shaft 42 to be rotated in the reverse direction. Consequently, the outer drum 52, the inner drum 54 and the screw plate 56 are also rotated in the reverse direction, and the wire 28 is wound out from the inner drum 54.

The slider 20 is thus moved toward the front side of the vehicle along the guide rail 24 through the wire 28 so that the webbing 14 is automatically separated from the occupant 12.

In the webbing drive apparatus 10 which drives the webbing 14 to be fitted around the occupant 12 and removed therefrom in the above-described manner, the rotational force is transmitted from the inner drum 54 to the screw plate 56 by the bent portions 56E which are each formed as a contact portion by bending the metal plate of the screw plate 56 which is opposed to the inner drum 54. Since each of the contact surfaces have a large area, as compared with the case in which a cut end surface of a metal plate is simply used as a contact portion, transmission of the rotational force is performed with a high degree of efficiency. In addition, since the contact surfaces are smooth, the efficiency of the screw plate is increased.

What is claimed is:

1. A webbing drive apparatus for an automatic seat belt apparatus which functions to fit a webbing around a seat occupant by driving one end of said webbing, comprising:
   a wire which is connected to said one end of said webbing;
   a drum which is rotated by a driving force; and
   a screw plate with which said wire is engaged and which has portions for contact with said drum so as to be rotated through said contact portions, when said drum is rotated, whereby said wire is spirally wound around said drum and said one end of said webbing is driven, said contact portions having bent portions each of which is formed by bending substantially at right angles with respect to said direction of said rotational axis of said drum and which are brought into contact with said drum when said drum is rotated.

2. A webbing drive apparatus for an automatic seat belt apparatus according to claim 1, wherein said screw plate has a central hole and a thread provided on an inner peripheral wall of said central hole, and is engaged with a screw disposed at the rotational axis of said drum so as to be moved in the axial direction of said screw.

3. A webbing drive apparatus for an automatic seat belt apparatus according to claim 2, wherein said screw plate comprises a first ring portion which is engaged with said screw and a second ring portion which is connected to said first ring portion and having an inside surface which corresponds to an outside surface of said drum.

4. A webbing driving apparatus for an automatic seat belt apparatus according to claim 3, wherein said contact portions project from said first ring portion toward said second ring portion.

5. A webbing drive apparatus for an automatic seat belt apparatus according to claim 4, wherein the end of each of said contact portions is bent to form a substantially Ushape having opposite bent portions.

6. A webbing drive apparatus for an automatic seat belt apparatus according to claim 1, wherein said drum is provided with grooves each of which extends in the direction of said rotational axis of said drum and in which said contact portions are respectively received so as to be slidable along said grooves.

7. A webbing drive apparatus for an automatic seat belt apparatus according to claim 6, wherein each of said grooves has a substantially U shape and said bent portions are respectively brought into contact with the side walls of said grooves so as to be subjected to the rotational force of said drum.

8. A webbing drive apparatus for an automatic seat belt apparatus according to claim 7, wherein each of said bent portions comprises two parts corresponding to both sides of each of said grooves.

9. A webbing drive apparatus for an automatic seat belt apparatus according to claim 1, wherein said drum comprises a first drum around which said wire is wound and a second drum which is coaxially disposed around an outside surface of said first drum, thereby defining a space between said first and second drums.

10. A webbing drive apparatus for an automatic seat belt apparatus according to claim 9, wherein the space between said first drum and said second drum is determined to be between a value equivalent to the diameter of said wire and a value representing twice said diameter.

11. A webbing drive apparatus for an automatic seat belt apparatus according to claim 10, wherein said screw plate is provided with a through hole through which said first drum passes.

12. A webbing drive apparatus for an automatic seat belt apparatus in which a webbing to be fitted is automatically fitted around an occupant by moving one end of said webbing toward the rear side of a vehicle, as well as being automatically removed from said occupant by moving said one end toward the front end of said vehicle, comprising:
    a slider which is movable toward said front side and said rear side of said vehicle while supporting said one end of said webbing;
    a wire one end of which is connected to said slider which is thus moved toward said front side and said rear side of said vehicle;
    a drum which is rotated by a driving force; and
    a screw plate with which the other end of said wire is engaged and which has portions for contact with said drum so as to be rotated in the same direction as that of said drum through said contact portions, when said drum is rotated, whereby said slider is moved toward said rear side of said vehicle when said wire is wound around said drum and said slider is moved toward said front side of said vehicle when said wire is wound out from said drum, said contact portions having bent portions each of which is bent substantially at right angles with respect to the rotational direction of said drum and which are brought into contact with said drum so that the rotational force of said drum is transmitted thereto.

13. A webbing drive apparatus for an automatic seat belt apparatus according to claim 12, wherein said drum is provided with grooves which extend in the direction of the rotational axis of said drum and in which said contact portions are respectively received so as to be movable along said grooves.

14. A webbing drive apparatus for an automatic seat belt apparatus according to claim 13, wherein each of said grooves has a substantially U-shaped cross-section, and said bent portions are respectively brought into contact with the side walls of said grooves so as to be subjected to the rotational force of said drum.

15. A webbing drive apparatus for an automatic seat belt apparatus according to claim 14, wherein each of said bent portions comprises two parts corresponding to said side walls of each of said grooves.

16. A webbing drive apparatus for an automatic seat belt apparatus according to claim 12, wherein said screw plate has a central hole and a thread provided on an inner peripheral wall of said central hole, and is engaged with a screw disposed at the rotational axis of said drum so as to be moved in the axial direction of said screw.

17. A webbing drive apparatus for an automatic seat belt apparatus according to claim 16, wherein said screw plate comprises a first ring portion which is engaged with said screw and a second ring portion which is connected to said first ring portion, said second ring portion having an inside surface which corresponds to an outside surface of said drum, and said contact portions are so formed as to project from said first ring portion toward said second ring portion.

18. A webbing drive apparatus for an automatic seat belt apparatus according to claim 17, wherein each of said contact portion is bent at its end to form a substantially U shape having opposite bent portions.

* * * * *